United States Patent [19]
Blumberg

[11] 3,965,840
[45] June 29, 1976

[54] METHODS AND APPARATUS FOR CONTROLLING THE PROPULSION OF AQUATIC VESSELS INCORPORATING SUCH APPARATUS

[75] Inventor: Jonathan Mark Blumberg, Creaton, England

[73] Assignee: Gec-Elliott Automation Limited, Borehamwood, England

[22] Filed: Nov. 18, 1974

[21] Appl. No.: 524,566

[30] Foreign Application Priority Data
Nov. 21, 1973 United Kingdom............... 53937/73

[52] U.S. Cl. .......................... 114/144 B; 235/150.2
[51] Int. Cl.$^2$ ....................................... B63H 25/00
[58] Field of Search ............... 114/147, 144 B, 151, 114/148; 115/35; 235/150.2

[56] References Cited
UNITED STATES PATENTS

| | | |
|---|---|---|
| 837,288 | 12/1906 | Dieckmann.......................... 114/148 |
| 2,735,393 | 2/1956 | White................................. 114/147 |
| 3,311,079 | 3/1967 | Berne............................... 114/144 B |
| 3,508,512 | 4/1970 | Desrayaup et al. ............. 114/144 B |
| 3,509,844 | 5/1970 | Doyle.................................. 114/147 |
| 3,730,126 | 5/1973 | Zunderdorp et al. ........... 114/144 B |

*Primary Examiner*—Stephen G. Kunin
*Attorney, Agent, or Firm*—Kirschstein, Kirschstein, Ottinger & Frank

[57] ABSTRACT

For the purpose of controlling the position of an oil rig or other vessel, it is provided with a plurality of steerable thrusters, one pair being located at the bow and one pair at the stern. The two thrusters of each pair are arranged to exert thrust at an angle of 90° so that the net thrust vector may be "steered" merely by controlling the magnitude and direction of thrust of each thruster. By this means it is only necessary to change the directions of the thrust of the thrusters relatively infrequently.

4 Claims, 4 Drawing Figures

METHODS AND APPARATUS FOR CONTROLLING THE PROPULSION OF AQUATIC VESSELS INCORPORATING SUCH APPARATUS

This invention relates to methods and apparatus for controlling the propulsion of aquatic vessels, and aquatic vessels incorporating such apparatus.

The invention relates more particularly to vessels equipped with at least one group of steerable thrusters, the or each group of thrusters containing a plurality of individually steerable, individually variable-thrust thrusters. By "steerable" it is meant that each thruster can be controlled to provide thrust in any desired direction (relative to the vessel) in a horizontal plane. Such thrusters can be used to maneuver a vessel at sea, or in a dock or inland waterway, or any other body of water on which the vessel is floating or hovering. However, typical steerable thrusters can only be steered slowly compared to the rate of change of thrust of which they are capable. Thus if the direction of thrust needs to be changed rapidly, the thrusters may not be capable of meeting such thrust requirements, and high wear rates may result from frequent large-angle direction changes.

It is therefore an object of the invention to provide an improved method and apparatus in which the aforementioned problems are obviated or mitigated.

According to a first aspect of the invention there is provided a method of controlling the propulsion of an aquatic vessel equipped with at least one group of steerable thrusters, the or each group of thrusters containing a plurality of individually steerable, individually variable-thrust thrusters, comprising the steps of steering at least one but not all of the thrusters of the or each group to direct its or their thrust on one side of a direction in which the net thrust vector of that group is to be directed, steering at least one other or the remainder of the thrusters to direct its or their thrust on the other side of said direction, and controlling the thrust developed by each thruster so that the net thrust vector of said group is directed substantially in said direction, whereby the direction of the net thrust vector may be varied in a range of directions by changing the thrusts produced by individual thrusters and without steering the thrusters. Thus the invention depends upon the principle that a vector can be formed of two further vectors, and that the first said vector can have its magnitude and direction varied in a plane which is coplanar with said further vectors by changing only the magnitude and not the direction of the two further vectors. As one special case, these two further vectors may be mutually orthogonal, i.e. $x$ and $y$ Cartesian coordinates. In the aforesaid method, the plane referred to above is the horizontal plane, since vertical thrusts are not wanted in practice. The respective thrusters may be directed at 45° to either side of said direction, whereby the net thrust vector may be "steered" over a range of 90° without actually steering any thruster, or putting any thruster into reverse. Thrust in the other quadrants can be obtained by reversing the thrust of one or other or both of the thrusters, the orientation of the thrusters remaining unaltered. This can be an advantage when quicker changes in the direction of vector thrust are desirable or necessary than are obtainable by steering the thrusters. Nevertheless, the thrusters can advantageously be steerable so that they can be oriented in such a way that they can operate for most of the time in the more efficient forward thrust mode rather than in the less efficient reverse thrust mode. The method may include the further step of steering one or more of the thrusters of each group of thrusters intermittently or continuously at a rate which is slow relative to the rate of thrust changes to keep the thrust exerted by each of the respective thrusters of said group of approximately equally on either side of the net thrust vector. Thus as the direction of the net thrust vector varies over a long period of time the long term outputs of individual thrusters are equalised and hence the accumulative wear of the respective thrusters is equalised.

According to a second aspect of the invention there is provided apparatus for controlling the propulsion of an aquatic vessel equipped with at least one group of steerable thrusters, the or each group of thrusters containing a plurality of individually steerable, individually variable-thrust thrusters comprising control means for steering at least one but not all of the thrusters of the or each group to direct its or their thrust on one side of a direction in which the net thrust of that group is to be directed, for steering at least one other or the remainder of the thrusters to direct its or their thrust on the other side of said direction, and for controlling the thrust developed by each thruster so that the net thrust vector of said group is directed substantially in said direction, whereby the direction of the net thrust vector may be varied in a range of directions by changing the thrusts produced by individual thrusters and without steering the thrusters. The apparatus may be such as to steer the respective thrusters to 45° on either side of said direction, and preferably functions to steer the thrusters intermittently or continuously at a rate which is slow relative to the rate of thrust changes to keep the respective thrusters approximately equally on either side of the mean of said direction as said mean varies in the long term.

According to a third aspect of the invention there is provided an aquatic vessel equipped with at least one group of steerable thrusters, the or each group of thrusters containing a plurality of individually steerable, individually variable-thrust thrusters, power supply means to power said thrusters, thrust control means to control the thrusters to produce a controllably variable thrust, steering means to steer said thrusters about respective individual vertical axes to direct their respective thrusts substantially in predetermined directions, and incorporating the apparatus of the second aspect of the invention coupled to said thrust control means.

The vessel may have two groups of thrusters, one located at or near the bow and the other at or near the stern. The number of thrusters in the or each group may be two.

Embodiments of the present invention will now be described, by way of example, with reference to the accompanying drawings in which.

Figure 1:
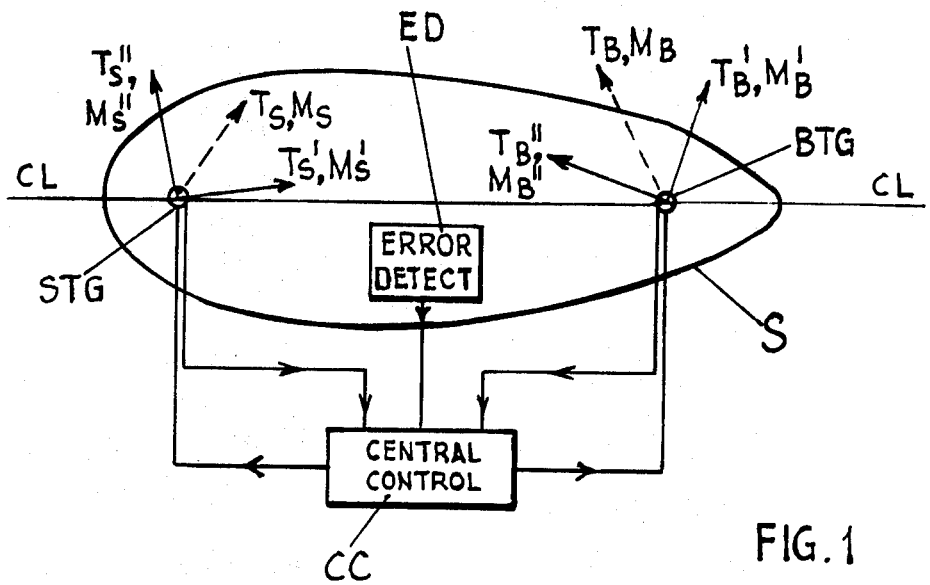
FIG. 1 shows in diagrammatic form a ship with a group of thrusters at the bow and stern operated in accordance with the present invention.

Referring now to FIG. 1, a ship S is equipped with a stern group of thrusters STG and a bow group of thrusters BTG. Each group of thrusters includes a pair of thrusters each one of a pair being an electrically driven propeller blade and being individually rotatable with respect to the other one of the respective pair. For the sake of simplicity only one thruster is shown since it is convenient to consider that the thrusters are mounted in a single position. If the thrusters are in fact mounted any distance apart as in fact they normally will be then a correction will be required in the central control circuit CC to compensate for this.

The central control CC receives signals from the thruster groups STG and BTG and from an error detection circuit ED. The signals from the thruster groups STG and BTG are in the nature of feedback signals giving the pitch of each thruster propeller blade and the direction of thrust of each thruster. The error detection circuit determines by how much the ships actual position varies from the required position and feeds a signal to the control circuitry to this effect. In a conventional ship positioning system the control circuitry sends control signals to alter both the pitch of the propellers to alter the magnitude of the thrust and to rotate the thrusters to alter the direction of thrust.

In the present invention the control system requires only to send signals to alter the pitch of the thruster propellers. This is accomplished as follows. Assume that the required directions of thrust to maintain the ship stationary are shown by the arrowed dotted lines $T_S$-$M_S$ and $T_B$-$M_S$ and that the magnitude of these thrusts are equal to $M_S$ and $M_B$ as indicated. Instead of pointing both thrusters of the bow pair in the single direction along the dotted line $T_B, M_B$ one thruster is pointed along the line $T_B', M_B'$ and the other along the line $T_B'', M_B''$. These lines are preferably at angles of 45° to the line $T_B, M_B$ The magnitude of the thrusts of each thruster are adjusted by the central control such that the resultant magnitude of thrust is equal to the required thrust $M_B$.

Similarly at the stern the required thrust $T_S$, $M_S$ is produced by the two thrusters in the pair pointing along the lines $T_S'', M_S'$ and $T_S'', M_S''$. The stern arrangement is controlled by the central control circuit CC in the same manner as the bow arrangement and will therefore not be further described.

In order to alter the magnitude of the thrusts in the bow the pitch of both thrusters is altered by the same amount. In order to alter the direction of the thrust in the bow one of the pitches only is altered. By the vector principle this alteration of the magnitude of for example $T_B'$ turns the resultant vector $T_B$ in a required direction. By suitable alteration of both $T_B', T_M'$ and $T_B'', T_M''$ the resultant vector can be rotated through 360° without any actual rotation of any of the individual thrusters. Thus it is possible to obtain an extremely rapid variation in thrust both in the stern and bow since it is possible to alter the pitch of the various propellers very quickly.

If, for example, the wind direction and/or current changes over a period of time such that one thruster of a pair is required to produce a significantly higher thrust than the other, due to the average direction for the thrust vector changing, then it is preferred to redirect the thrusters so that they are again directed at about 45° on either side of the general direction of the thrust vector. This equalises the wear on each thruster of the pair.

It is possible to employ angles other than 45°, there may be more than two thrusters to a group, and the invention may also be practised with a single group of thrusters, or more than two groups.

Figure 3:
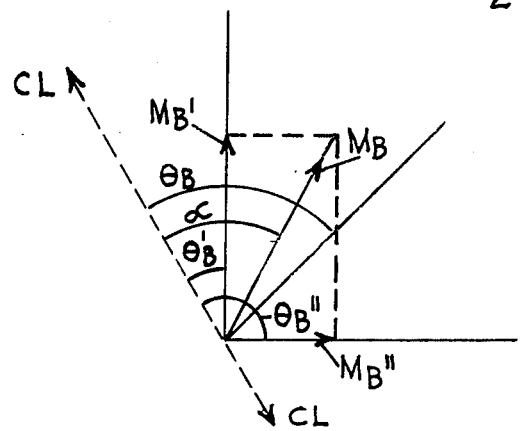
FIG. 3 shows a vector diagram of the thrusts produced at the bow of the ship of FIG. 1.

Referring now to FIG. 3, the thrust angles are shown in relation to the fore and aft axis of the ship CL—CL. The thrust required at the bow is at an angle $\alpha$ and the thrust supplied by the two thrusters $M_B'$ and $M_B''$ are respectively at angles $\theta_B'$ and $\theta_B''$ to the centre line. The bow and stern thruster arrangements are normally similar in operation and therefore only the bow arrangement will be described.

Figure 2:
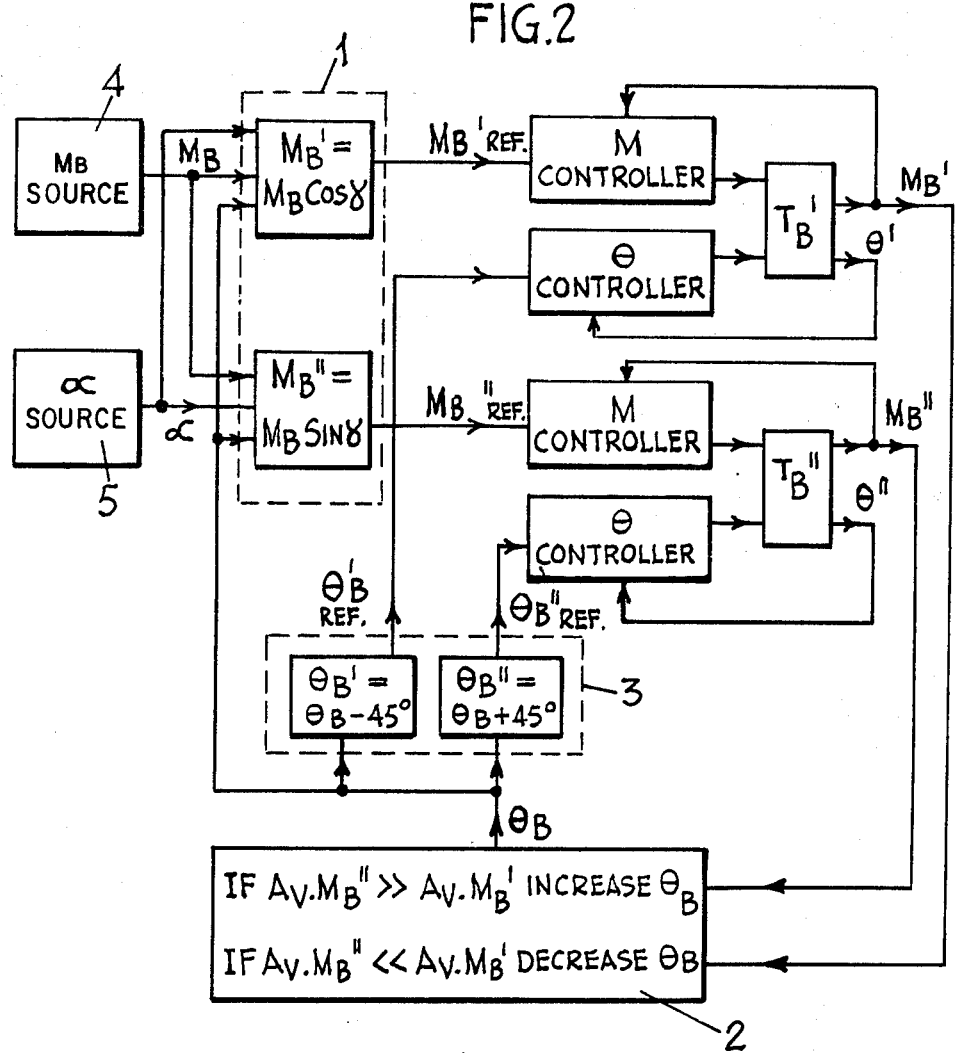
FIG. 2 shows apparatus for controlling the thrusts of the individual bow thrusters.

Referring now to FIG. 2, the apparatus for performing the control function is shown. The two bow thrusters $T_B'$ and $T_B''$ are shown as boxes for simplicity. Each thruster will comprise a variable pitch propeller and controls for altering the pitch of the propeller and for turning the propeller about a vertical axis to provide thrust in various required directions.

Each thruster $T_B'$, $T_B''$ will produce two output signals for feedback purposes. The first signal $\theta'$, $\theta''$ represents the angle or direction in which the respective bow thruster is pointing and $M_B'$, $M_B''$ represents the thrust produced by each thruster. The signals are fed as inputs to the respective M and $\theta$ controllers in which they are compared with the input angle and magnitude references obtained from the circuit 1. The thrust feedback signals are also fed to a circuit 2 the output of which is $\theta_B$ (where $\theta_B$ is the angle which is 45° either side of the angles $\theta_B'$ and $\theta_B''$). $\theta_B$ is fed as input to circuit 1 and to a circuit 3 the outputs of which are $\theta_B'$ and $\theta_B''$.

The functions of the circuits 1, 2 and 3 are shown by the equations within the boxes. These functions can be obtained by standard hardware.

With reference to FIG. 2, the following equations apply:

$$\theta_B' = \theta_B - 45°$$

$$\theta_B'' = \theta_B + 45°$$

$$M_B' = M_B \cos(\theta_B - 45° - \alpha) = M_B \cos\gamma$$

$$M_B'' = M_B \sin(\theta_B - 45° - \alpha) = M_B \sin\gamma$$

where
$M_B$ = required thrust in direction given by angle $\alpha$
$M_B'$ and $M_B''$ are as stated the vector components at angles $\theta_B'$ and $\theta_B''$.
$\gamma = (\theta - 45° - \alpha)$.

Thus by reference to FIG. 2 it may be seen that if the average thrust over a period of for example 5 minutes delivered by $T_B'$ is greater than the average by $T_B''$ then $\theta_B$ should be decreased to force the control loop of FIG. 2 to increase $M_B''$ and therefore decrease $M_B'$. Conversely $\theta_B$ should be increased if $M_B'$ is less than $M_B''$ averaged over a period of for example 5 minutes.

The signals representing $\theta_B + 45°$ and $\theta_B - 45°$ which are used as $\theta_B'$ reference and $\theta_B''$ reference signals for the $\theta$ controllers are produced in the circuit 3 by any available standard phase changing circuitry.

Similarly the $M_B'$ reference and $M_B''$ reference signals are produced in the circuit 1 by standard multiplication and subtraction circuitry from the input signals $M_B$, $\alpha$ and $\theta_B$. The sources of the input reference signals $M_B$ and $\alpha$ are represented diagrammatically by boxes 4 and 5 and these input reference signals are produced in known manner from input signals from the ship's instruments and they are the reference signals the accuracy of which determines the position keeping accuracy of the ship.

Figure 4:
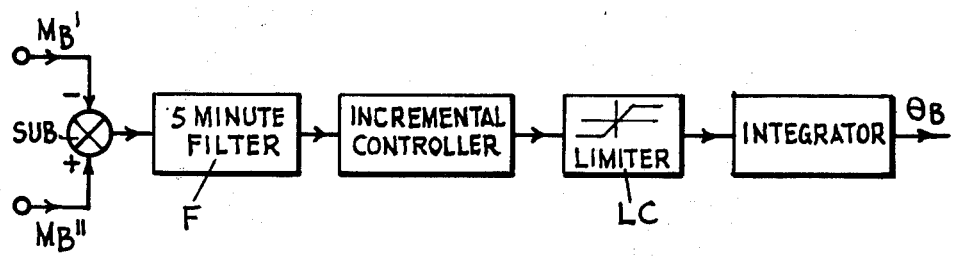
FIG. 4 shows in more detail block 2 of FIG. 2.

The circuit 2 of FIG. 2 is shown in more detail in FIG. 4. The input signals $M_B'$, $M_B''$ are fed to a subtraction circuit SUB the output of which is fed to a 5 minute filter F the output of which is fed to an incremental controller I.C. which therefore gives an output only when $M_B'$ and $M_B''$ differ by a significant amount for a time greater than 5 minutes. The output of the incremental controller is fed via a limiter circuit L.C. the output of which is fed to an integrator which gives as output the angle $\theta_B$. Thus when $M_B'$ and $M_B''$ differ by any significant amount for a period of greater than 5 minutes an incremental change is made in the angle $\theta_B$.

The period of 5 minutes is chosen as being a reasonable period for the control of for example an oil drilling rig in an open sea where conditions such as prevailing wind and/or sea currents may be expected to vary fairly slowly. In the event of a sudden gust of wind the value of the input reference signals $M_B$ and $\alpha$ are altered to retain the correct position of the ship in a known manner.

While the above embodiments of the invention were described in the context of station-keeping, the invention is equally applicable to maneuvering, and to travelling from one location to another. The invention can usefully be applied in cable-laying operations.

As well as being applicable to thruster-equipped ships, the invention can be used with other aquatic vessels, such as hovercraft utilising aerial propellers.

I claim:

1. A method of dynamically controlling the position of an aquatic vessel having at least two groups of steerable thrusters, each group of steerable thrusters including at least two individually steerable, individually variable-thrust thrusters, said method comprising the steps of steering at least one but not all of the thrusters of each group to direct its thrust on one side of a direction in which the net thrust vector of that group is to be directed, steering at least one other of the thrusters of each group to direct its thrust on the other side of said direction, maintaining two thrusters of a group at a constant angle with respect to each other, and controlling the thrust developed by each thruster of each group so that the net thrust vector of said group is directed substantially in said direction, whereby in response to automatically measured variable input conditions the direction of the net thrust of at least one of said groups is automatically varied in a range of directions at a relatively high speed by changing the thrusts produced by individual thrusters of that group without further steering of such thrusters.

2. Apparatus for dynamically controlling the position of an aquatic vessel having at least two groups of steerable thrusters, each group of steerable thrusters including at least two individually steerable, individually variable-thrust thrusters, said apparatus comprising automatic control means for steering at least one but not all of the thrusters of each said group to direct its thrust on one side of a direction in which the net thrust of that group is to be directed, means for steering at least one other of the thrusters of each said group to direct its thrust on the other side of said direction, means for controlling the thrust developed by each thruster of each said group so that the net thrust vector of said group is directed substantially in said direction, and means for automatically varying the direction of the net thrust vector of at least one of said groups at a relatively high speed by changing the thrusts produced by individual thrusters of that group and without further steering of such thrusters.

3. Apparatus for dynamically controlling the position of an aquatic vessel having at least two groups of steerable thrusters, each group of steerable thrusters including at least two individually steerable, individually variable-thrust thrusters, said apparatus comprising automatic control means for steering at least one but not all of the thrusters of each said group to direct its thrust on one side of a direction in which the net thrust of that group is to be directed, means for steering at least one other of the thrusters of each said group to direct its thrust on the other side of said direction, means for controlling the thrust developed by each thruster of each said group so that the net thrust vector of said group is directed substantially in said direction, means for automatically varying the direction of the net thrust vector of at least one of said groups at a relatively high speed by changing the thrusts produced by individual thrusters of that group and without further steering of such thrusters, and means to maintain two thrusters of a group at a constant angle with respect to each other.

4. An aquatic vessel equipped with at least two groups of steerable thrusters, each group of steerable thrusters including at least two individually steerable, individually variable-thrust thrusters, power supply means to power said thrusters of said groups, thrust control means to control the thrusters of said groups to produce a controllably variable thrust, steering means to steer said thrusters of said groups about respective individual vertical axes to direct their respective thrusts substantially in predetermined horizontal directions, control means for steering at least one but not all of the thrusters of each group of thrusters to direct its thrust on one side of a direction in which the net thrust of that group is to be directed, means for steering at least one other of the thrusters of each group to direct its thrust on the other side of said direction, means to maintain two thrusters of a group at a constant angle with respect to each other, and means for controlling the thrust developed by each thruster of each group so that the net thrust vector of said group is directed substantially in said direction, and means for automatically varying the direction of the net thrust vector of at least one of said groups at a relatively high speed by changing the thrusts produced by individual thrusters of that group and without further steering of such thrusters.

* * * * *